US011057106B2

United States Patent
Li et al.

(10) Patent No.: US 11,057,106 B2
(45) Date of Patent: Jul. 6, 2021

(54) METHOD AND APPARATUS FOR MONITORING MODULATION DEPTH OF DITHER SIGNAL AND OPTICAL TRANSMITTER

(71) Applicant: Fujitsu Limited, Kawasaki (JP)

(72) Inventors: Jingnan Li, Beijing (CN); Yangyang Fan, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/025,809

(22) Filed: Sep. 18, 2020

(65) Prior Publication Data

US 2021/0119699 A1    Apr. 22, 2021

(30) Foreign Application Priority Data

Oct. 21, 2019   (CN) .......................... 201910998746.9

(51) Int. Cl.
*H04B 10/079*    (2013.01)
*G02F 1/225*    (2006.01)
(Continued)

(52) U.S. Cl.
CPC ..... *H04B 10/07955* (2013.01); *G02F 1/0123* (2013.01); *G02F 1/225* (2013.01); *H04B 10/548* (2013.01); *G02F 1/212* (2021.01)

(58) Field of Classification Search
CPC ........ G02F 1/0123; G02F 1/225; G02F 1/212; H04B 10/07955; H04B 10/548

(Continued)

(56) References Cited

U.S. PATENT DOCUMENTS 5,119,447 A   6/1992 Trisno
5,170,274 A   12/1992 Kuwata et al.
(Continued)

FOREIGN PATENT DOCUMENTS

| CN | 101552636 A | 10/2009 |
|---|---|---|
| CN | 105099569 A | 11/2015 |
| EP | 0694182 B1 | 2/1999 |

OTHER PUBLICATIONS

Mohammad Sotoodeh etc. Modulator Bias and Optical Power Control of Optical Complex E-Field Modulators, Journal of Lightwave Technology, vol. 29, No. 15, Aug. 1, 2011 (14 pages).

(Continued)

*Primary Examiner* — Dalzid E Singh
(74) *Attorney, Agent, or Firm* — Staas & Halsey LLP

(57) ABSTRACT

Embodiments of this disclosure provide a method and apparatus for monitoring a modulation depth of a dither signal and an optical transmitter. The apparatus includes a detector to detect an optical signal output by a Mach-Zehnder modulator to obtain an electrical signal, a dither signal at a determined frequency is superimposed on a direct current bias voltage of the Mach-Zehnder modulator; a frequency-doubling dither signal synchronization detection module to perform synchronization detection on the electrical signal and a frequency-doubling dither signal at a frequency twice the determined frequency, to obtain an amplitude of a signal component contained in the electrical signal at a frequency identical to the frequency of the frequency-doubling dither signal A signal processor is to calculate a modulation depth of the dither signal superimposed on the direct current bias voltage according to the amplitude of the signal component at the frequency identical to the frequency of the frequency-doubling dither signal.

10 Claims, 7 Drawing Sheets

(51) Int. Cl.
*H04B 10/548* (2013.01)
*G02F 1/01* (2006.01)
*G02F 1/21* (2006.01)

(58) Field of Classification Search
USPC ............................................................ 398/38
See application file for complete search history.

(56) References Cited

U.S. PATENT DOCUMENTS

| | | | |
|---|---|---|---|
| 5,208,817 A | 5/1993 | Kao et al. | |
| 5,400,417 A | 3/1995 | Allie et al. | |
| 5,629,792 A | 5/1997 | Masaki | |
| 7,369,290 B1 | 5/2008 | Cox et al. | |
| 2008/0094123 A1 | 4/2008 | Koh et al. | |
| 2009/0003840 A1* | 1/2009 | Nahapetian | H04B 10/505 398/183 |
| 2009/0060528 A1* | 3/2009 | Takashima | H04B 10/50572 398/186 |
| 2009/0244685 A1 | 10/2009 | Hoshida et al. | |
| 2010/0119239 A1 | 5/2010 | Wang et al. | |
| 2010/0310260 A1* | 12/2010 | Mandai | H04B 10/677 398/202 |
| 2012/0288284 A1* | 11/2012 | Yoshida | H04B 10/5053 398/186 |
| 2012/0294627 A1* | 11/2012 | Qi | G02F 1/0123 398/183 |
| 2014/0168741 A1* | 6/2014 | Li | H04B 10/50575 359/239 |
| 2015/0236792 A1 | 8/2015 | Sugihara et al. | |
| 2018/0074348 A1* | 3/2018 | Fujita | G02F 1/225 |
| 2018/0267384 A1* | 9/2018 | Padmaraju | G02F 1/225 |
| 2019/0326998 A1* | 10/2019 | Chen | H04L 27/2096 |
| 2020/0033691 A1* | 1/2020 | Enoki | G02F 1/225 |

OTHER PUBLICATIONS

H. Kawakami, "Auto bias control technique for optical 16-QAM transmitter with asymmetric bias dithering", OE, vol. 19, No. 26 (5 pages).

H. Kawakami, "Drive-amplitude-independent Auto Bias Control Circuit for QAM Signals and Its Demonstration with an InP-based IQ Modulator", ECOC2016. 42nd European Conference and Exhibition on Optical Communications • Sep. 18-22, 2016 • Dusseldorf (3 pages).

* cited by examiner

METHOD AND APPARATUS FOR MONITORING MODULATION DEPTH OF DITHER SIGNAL AND OPTICAL TRANSMITTER

CROSS-REFERENCE TO RELATED APPLICATIONS

This application claims priority under 35 USC 119 to Chinese patent application no. 201910998746.9, filed on Oct. 21, 2019, in the China National Intellectual Property Administration, the entire contents of which are incorporated herein by reference.

TECHNICAL FIELD

This disclosure relates to the field of optical communication technologies.

BACKGROUND

In coherent optical communication, a Mach-Zehnder (M-Z) modulator is an important device in an optical transmitter, and converts electrical signals into optical signals.

The Mach-Zehnder modulator is inputted with a predetermined DC bias voltage so that it can work at a corresponding operating point. If the DC bias voltage inputted into the Mach-Zehnder modulator is shifted, communication quality will be degraded.

In order to monitor a DC bias status of the Mach-Zehnder modulator, researchers have proposed a variety of methods, such as directly loading a low-frequency dither signal on the DC bias voltage, or monitoring the DC bias voltage of the Mach-Zehnder modulator by loading a low-frequency dither signal on an RF signal by a driver amplifier.

In applying a dither signal, the modulation depth is controlled to be within a reasonable range. The modulation depth is related to a ratio of an amplitude α of the loaded dither signal and a half-wave voltage $V_\pi$ of the Mach-Zehnder modulator. For example, when the optical modulator is a differential Mach-Zehnder modulator, the modulation depth of the dither signal is defined as $$\frac{\alpha}{V_\pi};$$

and when the optical modulator is a single-ended Mach-Zehnder modulator, the modulation depth of the dither signal is defined as $$\frac{\alpha}{2V_\pi}.$$

When the modulation depth of the dither signal is relatively small, an amount of corresponding monitoring will be submerged in noises, and the bias state of the modulator cannot be effectively monitored; and when the modulation depth of the dither signal is relatively large, the dither signal will act as a kind of noise and causes interference with a driving signal, thereby incurring additional code error costs and deteriorating communication quality.

A conventional Mach-Zehnder modulator usually uses lithium niobate. The modulator made from lithium niobate material has a linear voltage-phase relationship, and its half-wave voltage is not independence on a DC bias point, but is determined by characteristics of the modulator itself, and is unadjustable, hence, the modulation depth of the dither signal may be controlled by only adjusting the amplitude of the dither signal. Usually, after a compromise is made between a working performance of the modulator and the cost of the dither signal, the amplitude of the dither signal is fixed at a reasonable value. Therefore, its modulation depth is substantially regarded as being of a fixed value.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in recent years, Mach-Zehnder modulators based on multiple different materials have emerged, such as an indium phosphide modulator, and a silicon-based modulator. Voltage-phase relationships of these modulators are no longer linear, and their half-wave voltages are in dependence on DC bias points. Therefore, a modulation depth of a dither signal is not only related to an amplitude of the dither signal, but also related to such factors as a nonlinearity of a voltage-phase relationship, and a magnitude of a DC bias voltage. Moreover, modulation depths of different dither signals will incur different levels of dither signal costs. Therefore, there is a need to accurately monitor the modulation depth of the dither signal, so that the amplitude of the dither signal can be adjusted more reasonably, and the modulation depth may be controlled to be within a reasonable range.

Embodiments of this disclosure provide a method and apparatus for monitoring a modulation depth of a dither signal and an electronic device. The apparatus detects an optical signal outputted by a Mach-Zehnder (M-Z) modulator to obtain an electrical signal, and calculates a modulation depth of a frequency-doubling dither signal according to an amplitude of the dither signal, thereby accurately monitoring the modulation depth of the dither signal.

According to a first aspect of the embodiments of this disclosure, there is provided an apparatus for monitoring a modulation depth of a dither signal, the apparatus including: a detector configured to detect an optical signal outputted by a Mach-Zehnder modulator to obtain an electrical signal, wherein a dither signal at a predetermined frequency is superimposed on a direct current bias voltage of the Mach-Zehnder modulator; a frequency-doubling dither signal synchronization detection module configured to perform synchronization detection on the electrical signal outputted by the detector and a frequency-doubling dither signal at a frequency twice the predetermined frequency, to obtain an amplitude of a signal component contained in the electrical signal outputted by the detector at a frequency identical to the frequency of the frequency-doubling dither signal; and a signal processor configured to calculate a modulation depth of the dither signal superimposed on the direct current bias voltage according to an amplitude of the frequency-doubling dither signal.

According to a second aspect of the embodiments of this disclosure, there is provided a method for monitoring a modulation depth of a dither signal, the method including: detecting an optical signal outputted by a Mach-Zehnder modulator to obtain an electrical signal, wherein a dither signal at a predetermined frequency is superimposed on a direct current bias voltage of the Mach-Zehnder modulator; performing synchronization detection on the electrical signal outputted by the detector and a frequency-doubling dither signal at a frequency twice the predetermined frequency, to obtain an amplitude of a signal component contained in the electrical signal outputted by the detector at a frequency identical to the frequency of the frequency-doubling dither signal; and calculating a modulation depth of the dither signal superimposed on the direct current bias voltage according to an amplitude of the frequency-doubling dither signal.

According to a third aspect of the embodiments of this disclosure, there is provided an optical transmitter, including the apparatus as described in the first aspect of the embodiments An advantage of the embodiments of this disclosure exists in that the optical signal outputted by the Mach-Zehnder (M-Z) modulator is detected to obtain an electrical signal, and the modulation depth of the frequency-doubling dither signal is calculated according to the amplitude of the dither signal, thereby accurately monitoring the modulation depth of the dither signal.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

First Aspect of Embodiments

The first aspect of the embodiments provides an apparatus for monitoring a modulation depth of a dither signal.

Figure 1:
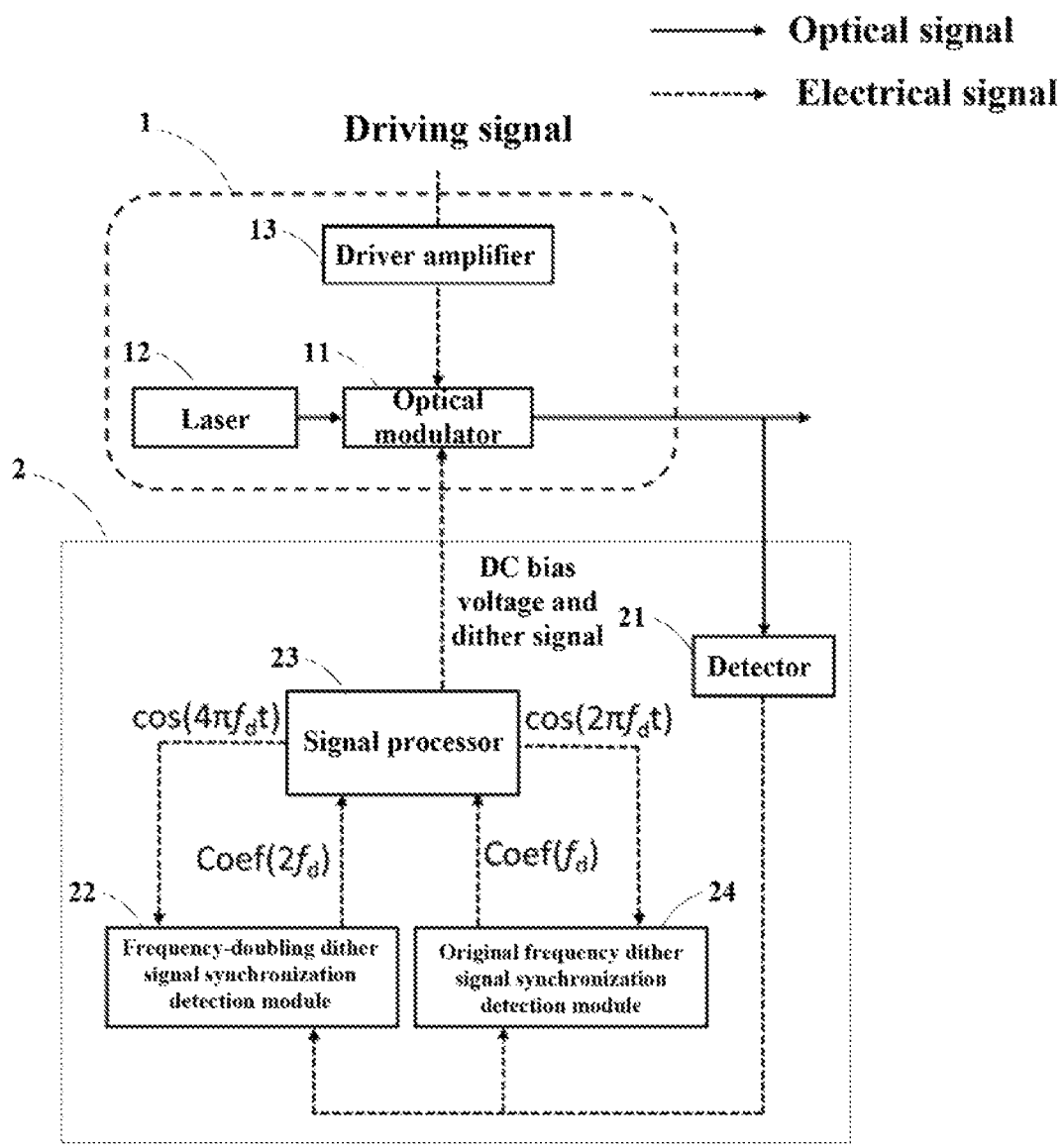
FIG. 1 is a schematic diagram of the apparatus for monitoring a modulation depth of a dither signal of the first aspect of the embodiments of this disclosure.
Figure 2:
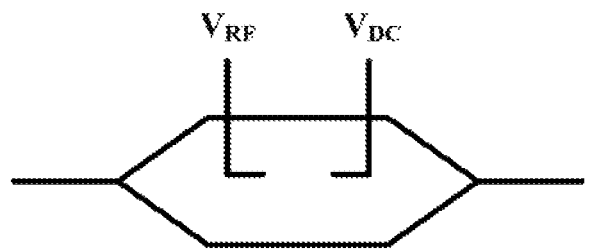
FIG. 2 is a schematic diagram of a single Mach-Zehnder (M-Z) modulator of the first aspect of the embodiments of this disclosure.
Figure 3:
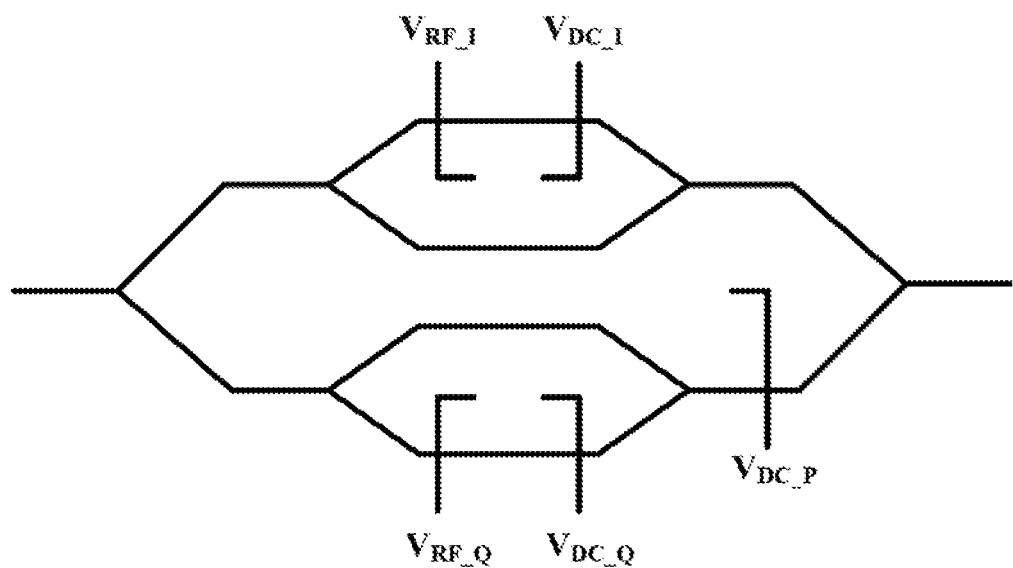
FIG. 3 is a schematic diagram of an IQ Mach-Zehnder (M-Z) modulator of the first aspect of the embodiments of this disclosure.

FIG. 1 is a schematic diagram of the apparatus for monitoring a modulation depth of a dither signal of the first aspect of the embodiments of this disclosure, FIG. 2 is a schematic diagram of a single Mach-Zehnder (M-Z) modulator of the first aspect of the embodiments of this disclosure, and FIG. 3 is a schematic diagram of an IQ Mach-Zehnder (M-Z) modulator of the first aspect of the embodiments of this disclosure.

As shown in FIG. 1, the apparatus 2 for monitoring a modulation depth of a dither signal performs monitoring according to an optical signal outputted by an optical modulating unit 1.

As shown in FIG. 1, the optical modulating unit 1 may include: a Mach-Zehnder (M-Z) modulator (optical modulator) 11, a laser 12 and a driver amplifier 13.

In at least one embodiment, the Mach-Zehnder (MZ) modulator 11 may be a single Mach-Zehnder (MZ) modulator as shown in FIG. 2 or an IQ Mach-Zehnder (MZ) modulator as shown in FIG. 3, or a Mach-Zehnder (MZ) modulator in another form.

$V_{RF}$ in FIG. 2 denotes an input driving signal, $V_{DC}$ denotes a DC bias voltage; and $V_{RF\_I}$ in FIG. 3 denotes an input driving signal of an in-phase (I) modulator, $V_{DC\_I}$ denotes a DC bias voltage of the in-phase (I) modulator, $V_{RF\_Q}$ denotes an input driving signal of a quadrature (Q) modulator, $V_{DC\_Q}$ denotes a DC bias voltage of the quadrature (Q) modulator, and $V_{DC\_P}$ denotes a DC bias voltage of a quadrature phase adjusting unit.

In at least one embodiment, the Mach-Zehnder modulator 11 may be applied with a DC bias voltage, so that the Mach-Zehnder modulator 11 operates at an operating point corresponding to the DC bias voltage. The laser 12 provides an optical carrier for the Mach-Zehnder (M-Z) modulator 11, and the driver amplifier 13 amplifies a driving signal and inputs it into the Mach-Zehnder (M-Z) modulator 11.

In at least one embodiment, the apparatus 2 for monitoring a modulation depth of a dither signal includes a detector 21, a frequency-doubling dither signal synchronization detection module 22 and a signal processor (signal generator) 23.

As shown in FIG. 1, the detector 21 detects an optical signal outputted by the Mach-Zehnder (M-Z) modulator 11 to obtain an electrical signal, wherein a dither signal at a predetermined frequency is superimposed on a direct current bias voltage of the Mach-Zehnder modulator 11.

As shown in FIG. 1, the frequency-doubling dither signal synchronization detection module 22 performs synchronization detection on the electrical signal outputted by the detector 21 and a frequency-doubling dither signal at a frequency twice the predetermined frequency $f_d$ (i.e. the frequency is $2f_d$), to obtain an amplitude $Coef(2f_d)$ of a frequency-doubling dither signal contained in the electrical signal outputted by the detector 21.

As shown in FIG. 1, the signal processor 23 calculates a modulation depth $$\frac{\alpha}{V_\pi^{local}}$$

of the dither signal superimposed on the direct current bias voltage according to the amplitude $Coef(2f_d)$ of the signal component at the frequency identical the frequency of the frequency-doubling dither signal obtained by the frequency-doubling dither signal synchronization detection module 22.

According to the first aspect of the embodiments of this disclosure, the apparatus 2 for monitoring a modulation depth of a dither signal detects the optical signal outputted by the Mach-Zehnder (M-Z) modulator 11 to obtain the electrical signal, and calculates the modulation depth of the dither signal according to the amplitude of the frequency-doubling dither signal contained in the electrical signal. Hence, the modulation depth of the dither signal may be accurately monitored, thereby facilitating reasonable adjustment of the amplitude of the dither signal and controlling the modulation depth to be within a reasonable range.

In at least one embodiment, as shown in FIG. 1, the apparatus 2 for monitoring a modulation depth of a dither signal may further include an original frequency dither signal synchronization detection module 24.

The original frequency dither signal synchronization detection module 24 performs synchronization detection on the electrical signal outputted by the detector 21 and an original frequency dither signal at a frequency that is the predetermined frequency, to obtain the amplitude $Coef(f_d)$ of the signal component contained in the electrical signal outputted by the detector 21 at a frequency identical to the frequency of the original frequency dither signal.

The signal processor 23 calculates the modulation depth $$\frac{\alpha}{V_\pi^{local}}$$

of the dither signal superimposed on the direct current bias voltage according to the amplitude $Coef(2f_d)$ of the signal component at a frequency identical to the frequency of the frequency-doubling dither signal obtained by the frequency-doubling dither signal synchronization detection module 22 and the amplitude $Coef(f_d)$ of the signal component at a frequency identical to the frequency of the original frequency dither signal obtained by the original frequency dither signal synchronization detection module 24.

Thus, in case of absence of the original frequency dither signal synchronization detection module 24, the signal processor 23 may calculate the modulation depth $$\frac{\alpha}{V_\pi^{local}}$$

of the dither signal according to $Coef(2f_d)$; and in case of presence of the original frequency dither signal synchronization detection module 24, the signal processor 23 may calculate the modulation depth $$\frac{\alpha}{V_\pi^{local}}$$

of the dither signal according to $Coef(2f_d)$ and $Coef(f_d)$.

In the first aspect of the embodiments of this disclosure, a principle of operation of the apparatus 2 for monitoring a modulation depth of a dither signal is explained by taking that the Mach-Zehnder (M-Z) modulator 11 is a differential IQ Mach-Zehnder (M-Z) modulator as an example. It should be noted that such explanation is also applicable to a case where the Mach-Zehnder (M-Z) modulator 11 is of other types.

In at least one embodiment, when the I modulator of the differential IQ Mach-Zehnder (M-Z) modulator 11 is biased near an extinction point (that is, there exists a deviation between the bias voltage and a bias voltage to which the extinction point corresponds), the Q modulator is biased at the extinction point and the quadrature phase adjusting unit is biased at a quadrature point, a light field at an output end of the differential IQ Mach-Zehnder (M-Z) modulator 11 may be expressed as the following relation (1):

$$E_{IQMZM} \propto \sqrt{P_0}^{1/2}[\sin(\varphi_{sI}+\Delta\varphi_{bI}+\varphi_d)+j\sin(\varphi_{sQ})] \quad (1);$$

where, $\varphi_{sI}$ and $\varphi_{sQ}$ are optical phase changes caused by driving signals loaded on the I and Q paths, $\Delta\varphi_{bI}$ is a phase offset caused by a DC bias offset of the I modulator, $\varphi_d$ is an optical phase change caused by the dither signal $V_d$, and $P_0$ is output optical power of the laser 12. The dither signal $V_d$ is a low-frequency cosine signal, which may be written as the following relation (2):

$$V_d = \alpha\cos(\omega_d t) \quad (2);$$

where, $\alpha$ is the amplitude of the dither signal $V_d$, and $\omega_d$ is an angular frequency of the dither signal; where, $\omega_d = 2\pi f_d$. As the dither signal is a small signal, the differential IQ Mach-Zehnder (M-Z) modulator 11 may still be deemed as having a locally linear characteristic at the small signal. The local slope may be written as $$\frac{\pi}{V_\pi^{local}},$$

and may change along with a change of the bias point, that is, at different bias points, $$\frac{\pi}{V_\pi^{local}}$$

are different due to that $V_\pi^{local}$ are different. Therefore, the optical phase change caused by the dither signal may be expressed as the following relation (3):

$$\varphi_d = \frac{\pi}{V_\pi^{local}} V_d = \frac{\pi\alpha}{V_\pi^{local}} \cos(\omega_d t). \tag{3}$$

After the optical signal outputted by the differential IQ Mach-Zehnder (M-Z) modulator 11 is detected by the detector 21, the obtained electrical signal $P_{PD}$ may be written as:

$$P_{PD} \propto R|E_{IQMZM}|^2 = RP_0 \frac{1}{8}[2 - \cos(2\varphi_{sI} + 2\Delta\varphi_{bI})\cos(2\varphi_d) + \sin(2\varphi_{sI} + 2\Delta\varphi_{bI})\sin(2\varphi_d) - \cos(2\varphi_{sQ})].$$

As small signals approximate, that is, $\sin(2\varphi_d) \approx 2\varphi_d$ and $\cos(2\varphi_d) \approx 1 - \frac{1}{2}(2\varphi_d)^2 = 1 - 2(\varphi_d)^2$, the electrical signal $P_{PD}$ may be expressed as the following relation (4):

$$P_{PD} \approx RP_0 \frac{1}{8}[2 - \cos(2\varphi_{sI} + 2\Delta\varphi_{bI})(1 - 2\varphi_d^2) + \tag{4}$$
$$\sin(2\varphi_{sI} + 2\Delta\varphi_{bI})2\varphi_d - \cos(2\varphi_{sQ})] =$$
$$RP_0 \frac{1}{8}\bigg[2 - \cos(2\varphi_{sI} + 2\Delta\varphi_{bI}) + \cos(2\varphi_{sI} + 2\Delta\varphi_{bI})$$
$$\left(\frac{\pi\alpha}{V_\pi^{local}}\right)^2 (1 + \cos(2\omega_d t)) +$$
$$2\sin(2\varphi_{sI} + 2\Delta\varphi_{bI})\frac{\pi\alpha}{V_\pi^{local}}\cos(\omega_d t) - \cos(2\varphi_{sQ})\bigg].$$

The original frequency dither signal synchronization detection module 24 performs synchronization detection on the electrical signal $P_{PD}$ and the original frequency dither signal $\cos(2\pi f_d t)$ at the frequency $f_d$, and a result of the synchronization detection may be expressed as the following relation (5):

$$\langle P_{PD} \cdot \cos(\omega_d t)\rangle = \tag{5}$$
$$\bigg\langle RP_0 \frac{1}{8}\bigg[2 - \cos(2\varphi_{sI} + 2\Delta\varphi_{bI}) + \cos(2\varphi_{sI} + 2\Delta\varphi_{bI})\left(\frac{\pi\alpha}{V_\pi^{local}}\right)^2$$
$$(1 + \cos(2\omega_d t)) + 2\sin(2\varphi_{sI} + 2\Delta\varphi_{bI})$$
$$\frac{\pi\alpha}{V_\pi^{local}}\cos(\omega_d t) - \cos(2\varphi_{sQ})\bigg] \cdot \cos(\omega_d t)\bigg\rangle =$$
$$RP_0 \frac{1}{8}\frac{\pi\alpha}{V_\pi^{local}}\sin(2\Delta\varphi_{bI})\langle\cos(2\varphi_{sI})\rangle.$$

The frequency-doubling dither signal synchronization detection module 22 performs synchronization detection on the electrical signal $P_{PD}$ and the frequency-doubling dither signal $\cos(4\pi f_d t)$ at the frequency $2f_d$, and a result of the synchronization detection may be expressed as the following relation (6):

$$\langle P_{PD} \cdot \cos(\omega_d t)\rangle = \tag{6}$$
$$\bigg\langle RP_0 \frac{1}{8}\bigg[2 - \cos(2\varphi_{sI} + 2\Delta\varphi_{bI}) + \cos(2\varphi_{sI} + 2\Delta\varphi_{bI})\left(\frac{\pi\alpha}{V_\pi^{local}}\right)^2$$
$$(1 + \cos(2\omega_d t)) + 2\sin(2\varphi_{sI} + 2\Delta\varphi_{bI})\frac{\pi\alpha}{V_\pi^{local}}\cos(\omega_d t) -$$
$$\cos(2\varphi_{sQ})\bigg] \cdot \cos(2\omega_d t)\bigg\rangle =$$
$$RP_0 \frac{1}{16}\left(\frac{\pi\alpha}{V_\pi^{local}}\right)^2 \cos(2\Delta\varphi_{bI})\langle\cos(2\varphi_{sI})\rangle.$$

In relations (5) and (6), $\langle \cdot \rangle$ denotes averaging processing, R denotes the responsivity of the detector 21, $P_0$ denotes the power of the laser outputted by the laser 12, and $RP_0$ denotes the multiplicative component.

In at least one embodiment, the original frequency dither signal synchronization detection module 24 outputs coef($f_d$), and the frequency-doubling dither signal synchronization detection module 22 outputs coef($2f_d$); where, coef($f_d$) denotes the amplitude of the signal component in the electrical signal at the frequency identical to the frequency of the original frequency dither signal generated by the detector 21, and coef($2f_d$) denotes the amplitude of the signal component in the electrical signal at the frequency identical to the frequency of the frequency-doubling dither signal generated by the detector 21; and $\langle P_{PD} \cdot \cos(\omega_d)\rangle =$ coef($f_d$) may be obtained according to relation (5), and $\langle P_{PD} \cdot \cos(2\omega_d)\rangle =$ coef($2f_d$) may be obtained according to relation (6).

As relation (5) contains a term $\sin(2\Delta\varphi_{bI})$ and relation (6) contains a term $\cos(2\Delta\varphi_{bI})$, a quartic equation may be established according to relations (5) and (6) by using a basic relation $\sin^2(2\Delta\varphi_{bI}) + \cos^2(2\Delta\varphi_{bI}) = 1$ of a trigonometric function, and the quartic equation may be written into relation (7):

$$(RP_0\langle\cos(2\varphi_{sI})\rangle)^2\left(\frac{\pi\alpha}{V_\pi^{local}}\right)^4 - \tag{7}$$
$$(\langle P_{PD} \cdot \cos(\omega_d t)\rangle \cdot 8)^2 \left(\frac{\pi\alpha}{V_\pi^{local}}\right)^2 - (\langle P_{PD} \cdot \cos(2\omega_d t)\rangle \cdot 16)^2 = 0.$$

According to the above $\langle P_{PD} \cdot \cos(\omega_d)\rangle =$ coef($f_d$) and $\langle P_{PD} \cdot \cos(2\omega_d)\rangle =$ coef($2f_d$), the above relation (7) may be written as the following relation (7a):

$$(RP_0\langle\cos(2\varphi_{sI})\rangle)^2\left(\frac{\pi\alpha}{V_\pi^{local}}\right)^4 - \tag{7a}$$
$$(coef(fd) \cdot 8)^2\left(\frac{\pi\alpha}{V_\pi^{local}}\right)^2 - (coef(2fd) \cdot 16)^2 = 0.$$

In relation (7a), $P_0$, R and a cosine mean value $\langle\cos(2\varphi_{SI})\rangle$ of the optical phase shift caused by an I-path driving signal may be a predetermined known value, and $\text{coef}(2f_d)$ and $\text{coef}(f_d)$ are values outputted by the frequency-doubling dither signal synchronization detection module 22 and the original frequency dither signal synchronization detection module 24, respectively. Hence, based on relation (7a), $$\frac{\alpha}{V_\pi^{local}}$$

may be calculated according to $\text{coef}(2f_d)$ and $\text{coef}(f_d)$.

In at least one embodiment, the signal processor 23 solves relation (7a) according to $\text{coef}(f_d)$ outputted by the original frequency dither signal synchronization detection module 24 and $\text{coef}(2f_d)$ outputted by the frequency-doubling dither signal synchronization detection module 22, and $$\frac{\alpha}{V_\pi^{local}}$$

may be obtained, which is the modulation depth of the dither signal.

In at least one embodiment, during operation of an auto bias controller (ABC), the phase offset $\Delta\varphi_{bI}$ caused by the DC bias offset of the I modulator is relatively small. Therefore, it may be deemed that $\sin(2\Delta\varphi_{bI})\approx 0$ and $\cos(2\Delta\varphi_{bI})\approx 1$. Hence, following relation (8) may be obtained by normalizing relation (6):

$$\frac{\text{coef}(2f_d)\cdot 16}{\pi^2 RP_0\langle\cos(2\varphi_{sI})\rangle} = \frac{\langle P_{AC}\cdot\cos(2\omega_d t)\rangle\cdot 16}{\pi^2 RP_0\langle\cos(2\varphi_{sI})\rangle} = \left(\frac{\alpha}{V_\pi^{local}}\right)^2 \cos(2\Delta\varphi_{bI}) \approx \left(\frac{\alpha}{V_\pi^{local}}\right)^2. \quad (8)$$

And following relation (9) may be obtained by performing square rooting on relation (8):

$$\sqrt{\frac{\text{coef}(2f_d)\cdot 16}{\pi^2 RP_0\langle\cos(2\phi_{sI})\rangle}} = \sqrt{\frac{\langle P_{AC}\cdot\cos(2\omega_d t)\rangle\cdot 16}{\pi^2 RP_0\langle\cos(2\varphi_{sI})\rangle}} = \frac{\alpha}{V_\pi^{local}}\sqrt{\cos(2\Delta\varphi_{bI})} \approx \frac{\alpha}{V_\pi^{local}}. \quad (9)$$

In relation (9), $\text{coef}(2f_d)$ is outputted by the frequency-doubling dither signal synchronization detection module 22, $RP_0$ denotes the multiplicative component, which may be a known quantity, and $\langle\cos(2\varphi_{SI})\rangle$ denotes the signal component, i.e. the mean value of the cosine value of the optical phase shift caused by the I-path driving signal, which may also be a known quantity. Therefore, the signal processor 23 may obtain the modulation depth $$\frac{\alpha}{V_\pi^{local}}$$

of the dither signal according to relation (9) by using $\text{coef}(2f_d)$ outputted by the frequency-doubling dither signal synchronization detection module 22 in connection with known $RP_0$ and $\cos(2\varphi_{SI})$.

In at least one embodiment, the signal processor 23 may further calculate a target adjustment amplitude of the dither signal according to the calculated modulation depth $$\frac{\alpha}{V_\pi^{local}}$$

and a current amplitude $\alpha$ and an initial modulation depth $$\frac{\alpha_0}{V_{\pi 0}^{local}}$$

of the dither signal. For example, the current amplitude $\alpha$ of the dither signal may be determined by the generation unit of the dither signal, the initial modulation depth $$\frac{\alpha_0}{V_{\pi 0}^{local}}$$

of the dither signal may be predetermined and stored, and the generation unit of the dither signal may be, for example, the signal processor 23.

A method for calculating the target adjustment amplitude of the dither signal by the signal processor 23 may be, for example, determining whether the calculated modulation depth $$\frac{\alpha}{V_\pi^{local}}$$

is equal to the initial modulation depth $$\frac{\alpha_0}{V_{\pi 0}^{local}},$$

if not, calculating that the target adjustment amplitude is $$\frac{V_\pi^{local}}{V_{\pi 0}^{local}}\alpha_0;$$

and furthermore, if the calculated modulation depth $$\frac{\alpha}{V_\pi^{local}}$$

is equal to the initial modulation depth $$\frac{\alpha_0}{V_{\pi 0}^{local}},$$

the target adjustment amplitude is equal to the current amplitude $\alpha$.

In at least one embodiment, as shown in FIG. 1, the signal processor 23 may generate the dither signal according to the calculated target adjustment amplitude, superimpose the dither signal on the DC bias voltage, and apply the DC bias voltage superimposed with the dither signal to the optical modulator 11, which is, for example, a differential IQ Mach-Zehnder (M-Z) modulator.

The dither signal generated by the signal processor 23 may be expressed as $\alpha \cos(2\pi f_d t)$. At an initial time, $\alpha=\alpha_0$, that is, $\alpha_0$ is an initial value of the amplitude of the dither signal, which may be preset; and after the signal processor 23 calculates the target adjustment amplitude, the target adjustment amplitude is assigned the value $\alpha$, to update the current amplitude of the dither signal.

In at least one embodiment, as shown in FIG. 1, the signal processor 23 may further generate the above original frequency dither signal $\cos(2\pi f_d t)$ and the frequency-doubling dither signal $\cos(4\pi f_d t)$, and $\cos(2\pi f_d t)$ and $\cos(4\pi f_d t)$ generated by the signal processor 23 may be respectively inputted into the original frequency dither signal synchronization detection module 24 and the frequency-doubling dither signal synchronization detection module 22 for detecting $\text{coef}(f_d)$ and $\text{coef}(2f_d)$.

In addition, the embodiment of this disclosure may not be limited to this. For example, at least one of the original frequency dither signal $\cos(2\pi f_d t)$, the frequency-doubling dither signal $\cos(4\pi f_d t)$, and the dither signal $\alpha \cos(2\pi f_d t)$ may not be generated by the signal processor 23, but may be generated by another signal generating unit.

In relations (7) and (9), a value of $RP_0 \langle \cos(2\varphi_{SI}) \rangle$ may be calculated and stored in advance, hence, the signal processor 23 may calculate the modulation depth $$\frac{\alpha}{V_\pi^{local}}$$

based on relation (7) or relation (9).

$RP_0$ may be used as the multiplicative component in relations (7) and (9), and $\langle \cos(2\varphi_{SI}) \rangle$ may be used as the signal component in relations (7) and (9).

Figure 4:
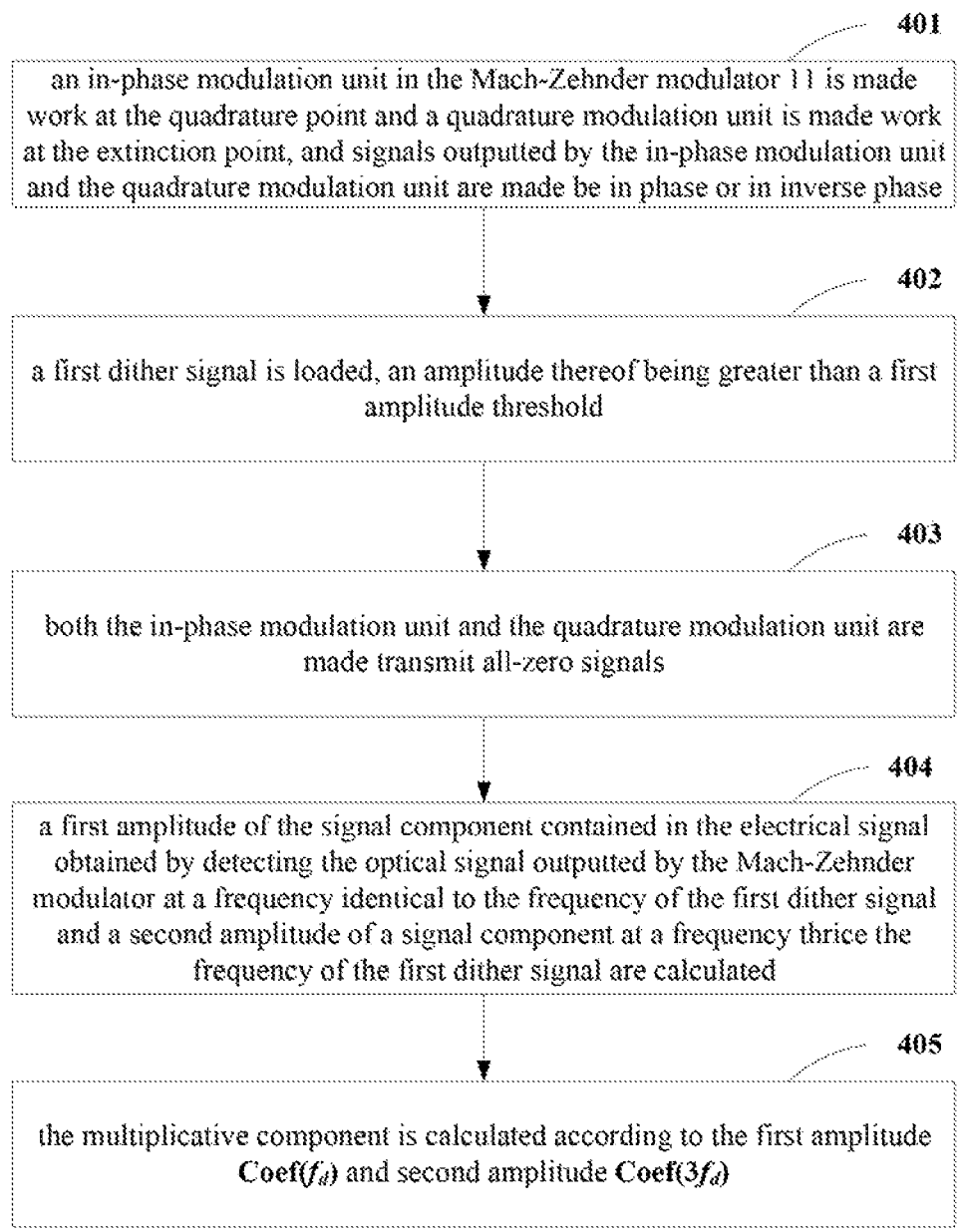
FIG. 4 is a schematic diagram of a method for calculating a multiplicative component.

FIG. 4 is a schematic diagram of a method for calculating the multiplicative component $RP_0$. As shown in FIG. 4, the method for calculating the multiplicative component $RP_0$ includes:

operation 401: an in-phase modulation (IMZM) unit in the Mach-Zehnder (M-Z) modulator 11 is made work at the quadrature point and a quadrature modulation (QMZM) unit is made work at the extinction point, and signals outputted by the in-phase modulation unit and the quadrature modulation unit are made be in phase or in inverse phase, such as making the in-phase modulation (IMZM) unit work at the quadrature point and the quadrature modulation (QMZM) unit work at the extinction point by adjusting $V_{DC\_I}$ and $V_{DC\_Q}$;

operation 402: a first dither signal is loaded, an amplitude thereof being greater than a first amplitude threshold, such as superimposing the first dither signal on $V_{DC\_I}$ and $V_{DC\_Q}$, so that the first dither signal may be loaded on the Mach-Zehnder (M-Z) modulator 11, a frequency of the first dither signal being, for example, $f_d$;

operation 403: both the in-phase modulation (IMZM) unit and the quadrature modulation (QMZM) unit are made transmit all-zero signals;

operation 404: a first amplitude $\text{Coef}(f_d)$ of the signal component contained in the electrical signal obtained by detecting the optical signal outputted by the Mach-Zehnder (M-Z) modulator at a frequency identical to the frequency of the first dither signal and a second amplitude $\text{Coef}(3f_d)$ of a signal component at a frequency thrice the frequency of the first dither signal are calculated, such as detecting the optical signal outputted by the Mach-Zehnder (M-Z) modulator 11 by the detector 21, and performing synchronization detection on the electrical signal outputted by the detector 21 by using the dither signal at the frequency $f_d$, to obtain the first amplitude $\text{Coef}(f_d)$, and performing synchronization detection on the electrical signal outputted by the detector 21 by using the dither signal at the frequency $3f_d$, to obtain the second amplitude $\text{Coef}(3f_d)$, the above relations (4) and (5) being able to be referred to for a particular method of synchronization detection; and furthermore, the first amplitude $\text{Coef}(f_d)$ may be obtained through calculation by the original frequency dither signal synchronization detection module 24, and the second amplitude $\text{Coef}(3f_d)$ may be obtained through calculation by a frequency-trebling dither signal synchronization detection module; wherein the frequency-trebling dither signal synchronization detection module may be a component of the apparatus 2 for monitoring a modulation depth of a dither signal, or may be a component disposed independent of the apparatus 2 for monitoring a modulation depth of a dither signal; and in operation 404, the obtained first amplitude $\text{Coef}(f_d)$ and second amplitude $\text{Coef}(3f_d)$ may be respectively expressed as:

$$Coef(f_d) = \frac{1}{8} RP_0 \left[ \frac{\pi\alpha}{V_\pi^{local}} - \frac{1}{2}\left(\frac{\pi\alpha}{V_\pi^{local}}\right)^3 \right],$$

$$Coef(3f_d) = \frac{1}{48} RP_0 \left( \frac{\pi\alpha}{V_\pi^{local}} \right)^3;$$

operation 405: the multiplicative component $RP_0$ is calculated according to the first amplitude $\text{Coef}(f_d)$ and second amplitude $\text{Coef}(3f_d)$, such as calculating the multiplicative component by using the following relation:

$$\text{multiplcative component} = \sqrt{\frac{[8 \cdot (Coef(f_d) + 3 \cdot Coef(3f_d))]^3}{48 \cdot Coef(3f_d)}}.$$

Moreover, the multiplicative component $RP_0$ calculated in operation 405 may be stored in the signal processor 23.

Figure 5:
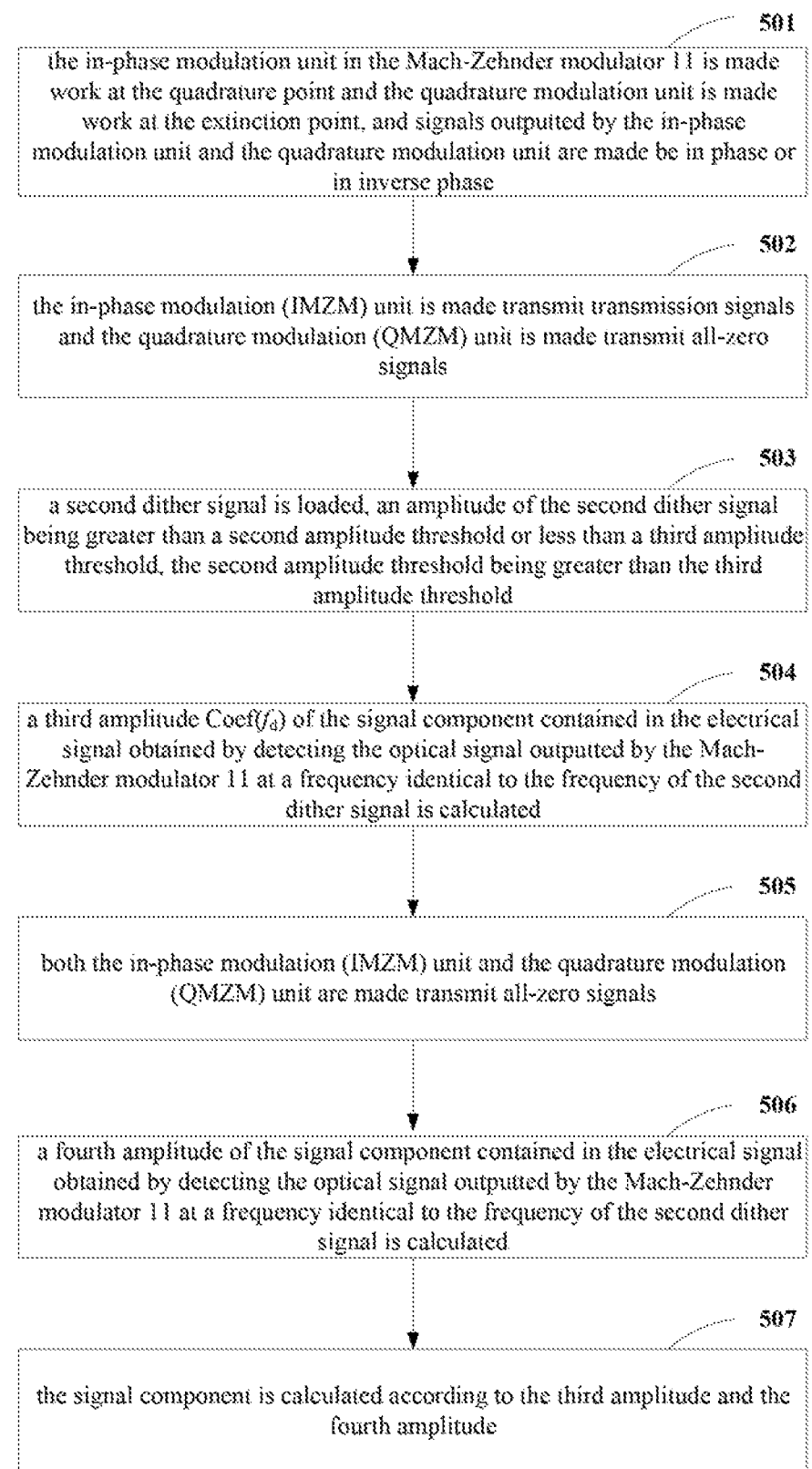
FIG. 5 is a schematic diagram of a method for calculating a signal component.

FIG. 5 is a schematic diagram of a method for calculating the signal component $\langle \cos(2\varphi_{SI}) \rangle$. As shown in FIG. 5, the method for calculating the signal component includes:

operation 501: the in-phase modulation (IMZM) unit in the Mach-Zehnder (M-Z) modulator 11 is made work at the quadrature point and the quadrature modulation (QMZM) unit is made work at the extinction point, and signals outputted by the in-phase modulation unit and the quadrature modulation unit are made be in phase or in inverse phase, such as making the in-phase modulation (IMZM) unit work at the quadrature point and the quadrature modulation (QMZM) unit work at the extinction point by adjusting $V_{DC\_I}$ and $V_{DC\_Q}$;

operation 502: the in-phase modulation (IMZM) unit is made transmit transmission signals and the quadrature modulation (QMZM) unit is made transmit all-zero signals;

operation 503: a second dither signal is loaded, an amplitude of the second dither signal being greater than a second amplitude threshold or less than a third amplitude threshold, the second amplitude threshold being greater than the third amplitude threshold, and a frequency of the second dither signal being, for example, $f_d$;

operation 504: a third amplitude Coef($f_d$) of the signal component contained in the electrical signal obtained by detecting the optical signal outputted by the Mach-Zehnder (M-Z) modulator 11 at a frequency identical to the frequency of the second dither signal is calculated, such as detecting the optical signal outputted by the Mach-Zehnder (M-Z) modulator 11 by the detector 21 and performing synchronization detection on the electrical signal outputted by the detector 21 by using the dither signal at the frequency $f_d$, to obtain the third amplitude Coef($f_d$), wherein the third amplitude Coef($f_d$) may be expressed as $$Coef(f_d) = \frac{1}{8} RP_0 \langle \cos(2\varphi_{sl}) \rangle \frac{\pi \alpha}{V_\pi^{local}};$$

operation 505: both the in-phase modulation (IMZM) unit and the quadrature modulation (QMZM) unit are made transmit all-zero signals;

operation 506: a fourth amplitude Coef($f_d$)|$_{\varphi_{Sl}=0}$ of the signal component contained in the electrical signal obtained by detecting the optical signal outputted by the Mach-Zehnder (M-Z) modulator 11 at a frequency identical to the frequency of the second dither signal is calculated, wherein the fourth amplitude Coef($f_d$)|$_{\varphi_{Sl}=0}$ may be expressed as $$Coef(f_d)|_{\varphi_{sl}=0} = \frac{1}{8} RP_0 \frac{\pi \alpha}{V_\pi^{local}};$$

operation 507: the signal component $\langle \cos(2\varphi_{Sl}) \rangle$ is calculated according to the third amplitude Coef($f_d$) and the fourth amplitude Coef($f_d$)|$_{\varphi_{Sl}=0}$, such as calculating the signal component by using the relation as below:

$$\text{signal component} \frac{Coef(f_d)}{Coef(f_d)|_{\varphi_{sl}=0}}$$

Moreover, the signal component calculated in operation 507 may be stored in the signal processor 23.

Figure 6:
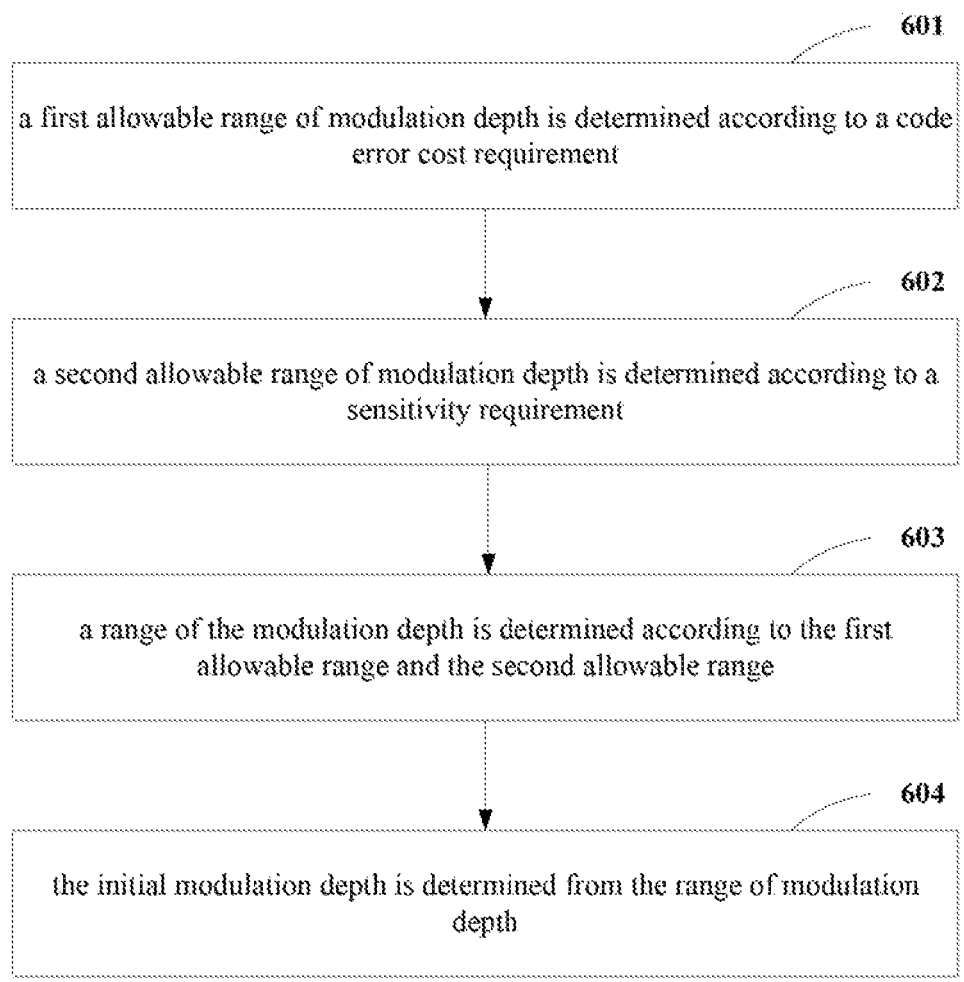
FIG. 6 is a schematic diagram of a method for setting an initial modulation depth.

FIG. 6 is a schematic diagram of a method for setting the initial modulation depth $$\frac{\alpha_0}{V_{\pi 0}^{local}},$$

As shown in FIG. 6, the method for setting the initial modulation depth may include:

operation 601: a first allowable range of modulation depth is determined according to a code error cost requirement, wherein the first allowable range is, for example, $$\frac{\alpha_1}{V_{\pi 1}^{local}} \leq \frac{\alpha}{V_\pi^{local}} \leq \frac{\alpha_2}{V_{\pi 2}^{local}},$$

and in operation 601, for example, the Mach-Zehnder (M-Z) modulator 11 may not be first loaded with a dither signal and a code error rate is calculated without a dither signal, then the cosine dither signal at the frequency $f_d$ and with the amplitude α is loaded, a value of the amplitude α of the dither signal is changed, and code error costs caused by different amplitudes of dither signal are calculated, thereby determining the first allowable range;

operation 602: a second allowable range of modulation depth is determined according to a sensitivity requirement, wherein the second allowable range is, for example, $$\frac{\alpha_3}{V_{\pi 3}^{local}} \leq \frac{\alpha}{V_\pi^{local}} \leq \frac{\alpha_4}{V_{\pi 4}^{local}},$$

and in operation 602, for example, the Mach-Zehnder (M-Z) modulator 11 may be loaded with the cosine dither signal at the frequency $f_d$ and with the amplitude α, a value of the amplitude α of the dither signal is changed, and sensitivities caused to which different amplitudes of dither signal correspond are calculated, thereby determining the second allowable range;

operation 603: a range of the modulation depth is determined according to the first allowable range and the second allowable range by, for example, taking a smaller one in upper limit values in the first allowable range and the second allowable range as an upper limit value of the range of the modulation depth and taking a larger one in lower limit values in the first allowable range and the second allowable range as a lower limit value of the range of the modulation depth, that is, $$\max\left(\frac{\alpha_1}{V_{\pi 1}^{local}}, \frac{\alpha_3}{V_{\pi 3}^{local}}\right) \leq \frac{\alpha}{V_\pi^{local}} \leq \min\left(\frac{\alpha_2}{V_{\pi 2}^{local}}, \frac{\alpha_4}{V_{\pi 4}^{local}}\right);$$

and operation 604: the initial modulation depth is determined from the range of modulation depth, such as randomly selecting a value from the range of modulation depth determined in operation 603 as the initial modulation depth $$\frac{\alpha_0}{V_{\pi 0}^{local}}.$$

Moreover, the initial modulation depth $$\frac{\alpha_0}{V_{\pi 0}^{local}}$$

obtained in operation 604 may be stored in the signal processor 23.

According to the first aspect of the embodiments of this disclosure, the apparatus 2 for monitoring a modulation depth of a dither signal detects the optical signal outputted by the Mach-Zehnder (M-Z) modulator 11 to obtain an electrical signal, and calculates the modulation depth of the dither signal according to the amplitude of the frequency-doubling dither signal contained in the electrical signal, thereby accurately monitoring the modulation depth of the dither signal, facilitating reasonable adjustment of the modulation depth of the dither signal, and controlling the modulation depth to be within a reasonable range.

Second Aspect of Embodiments

The second aspect of the embodiments provides a method for monitoring a modulation depth of a dither signal, corresponding to the apparatus for monitoring a modulation depth of a dither signal in the first aspect of the embodiments of this disclosure.

Figure 7:
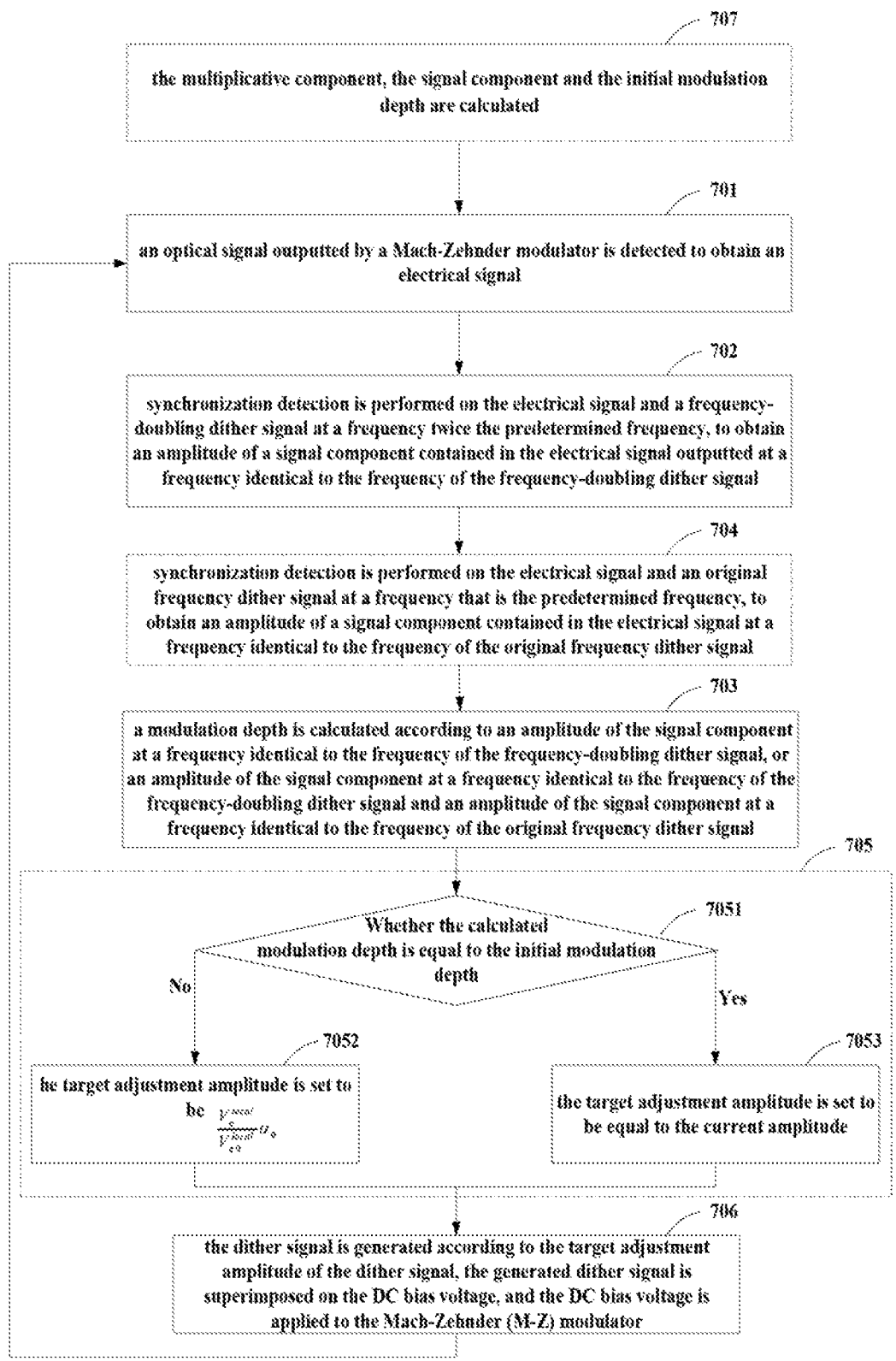
FIG. 7 is a schematic diagram of the method for monitoring a modulation depth of a dither signal of the second aspect of the embodiments of this disclosure.

FIG. 7 is a schematic diagram of the method for monitoring a modulation depth of a dither signal of the second aspect of the embodiments of this disclosure. As shown in FIG. 7, the method for monitoring a modulation depth of a dither signal includes:

operation 701: an optical signal outputted by a Mach-Zehnder modulator is detected to obtain an electrical signal, wherein, a dither signal at a predetermined frequency ($f_d$) is superimposed on a direct current bias voltage of the Mach-Zehnder modulator;

operation 702: synchronization detection is performed on the electrical signal outputted by the detector and a frequency-doubling dither signal at a frequency ($2f_d$) twice the predetermined frequency, to obtain an amplitude Coef($2f_d$) of a signal component contained in the electrical signal outputted by the detector at a frequency identical to the frequency of the frequency-doubling dither signal; and operation 703: a modulation depth $$\frac{\alpha}{V_\pi^{local}}$$

of the dither signal superimposed on the direct current bias voltage is calculated according to the amplitude Coef($2f_d$) of the frequency-doubling dither signal.

In at least one embodiment, in operation 703, the modulation depth $$\frac{\alpha}{V_\pi^{local}}$$

is calculated according to a responsivity R of the detector used for detecting an optical signal, power of a laser outputted by a laser providing an optical carrier for the Mach-Zehnder modulator, the signal component ⟨cos($2\varphi_{SI}$)⟩ and an amplitude Coef($2f_d$) of a signal component at a frequency identical to the frequency of frequency-doubling dither signal, such as by using the above-described relation (9).

As shown in FIG. 7, the method for monitoring a modulation depth of a dither signal may further include:

operation 704: synchronization detection is performed on the electrical signal and an original frequency dither signal at a frequency that is the predetermined frequency $f_d$, to obtain an amplitude Coef($f_d$) of a signal component contained in the electrical signal at a frequency identical to the frequency of the original frequency dither signal.

In a case where operation 704 exists, in operation 703, the modulation depth $$\frac{\alpha}{V_\pi^{local}}$$

a dither signal may be calculated according to an amplitude Coef($2f_d$) of a signal component at a frequency identical to the frequency of frequency-doubling dither signal and an amplitude Coef($f_d$) of a signal component at a frequency identical to the frequency of the original frequency dither signal.

In at least one embodiment, in a case where operation 704 exists, in operation 703, the modulation depth $$\frac{\alpha}{V_\pi^{local}}$$

is calculated according to the responsivity R of the detector used for detecting an optical signal, the power $P_0$ of the laser outputted by the laser providing an optical carrier for the Mach-Zehnder modulator, the signal component ⟨cos($2\varphi_{SI}$)⟩, Coef($2f_d$) and Coef($f_d$), such as by using the above-described relation (7).

As shown in FIG. 7, the method for monitoring a modulation depth of a dither signal may further include:

operation 705: a target adjustment amplitude of the dither signal is calculated according to the calculated modulation depth $$\frac{\alpha}{V_\pi^{local}}$$

and a current amplitude and an initial modulation depth of the dither signal.

As shown in FIG. 7, operation 705 may include:

operation 7051: it is determined whether the calculated modulation depth $$\frac{\alpha}{V_\pi^{local}}$$

is equal to the initial modulation depth $$\frac{\alpha_0}{V_{\pi 0}^{local}},$$

if not, proceeding with operation 7052, and if yes, proceeding with operation 7053;

operation 7052: the target adjustment amplitude is set to be $$\frac{V_\pi^{local}}{V_{\pi 0}^{local}}\alpha_0;$$

and operation 7053: the target adjustment amplitude is set to be equal to the current amplitude.

Furthermore, in at least one embodiment, as shown in FIG. 7, the method may further include:

operation 706: the dither signal is generated according to the target adjustment amplitude of the dither signal, the dither signal is superimposed on the DC bias voltage, and the DC bias voltage is applied to the Mach-Zehnder (M-Z) modulator.

In at least one embodiment, as shown in FIG. 7, the method for monitoring a modulation depth of a dither signal may further include:

operation 707: the multiplicative component $RP_0$, the signal component $\langle\cos(2\varphi_{SI})\rangle$ and the initial modulation depth $$\frac{\alpha_0}{V_{\pi 0}^{local}}$$

are calculated.

In operation 707, a method for calculating the multiplicative component $RP_0$ may be as shown in FIG. 4, a method for calculating the signal component $\langle\cos(2\varphi_{SI})\rangle$ may be as shown in FIG. 5, and a method for calculating the initial modulation depth $$\frac{\alpha_0}{V_{\pi 0}^{local}}$$

may be as shown in FIG. 6.

In the second aspect of the embodiments of this disclosure, reference may be made to the detailed description of the units in the apparatus for monitoring a modulation depth of a dither signal in the first aspect of the embodiments of this disclosure for the description of the steps of the method for monitoring a modulation depth of a dither signal.

According to the second aspect of the embodiments of this disclosure, the optical signal outputted by the Mach-Zehnder (M-Z) modulator is detected to obtain an electrical signal, and the modulation depth of the dither signal is calculated according to the amplitude of the frequency-doubling dither signal contained in the electrical signal, thereby accurately monitoring the modulation depth of the dither signal, facilitating reasonable adjustment of the modulation depth of the dither signal, and controlling the modulation depth to be within a reasonable range.

Third Aspect of Embodiments

The third aspect of the embodiments provides an optical transmitter, including the apparatus for monitoring a modulation depth of a dither signal as described in the first aspect of embodiments.

Figure 8:
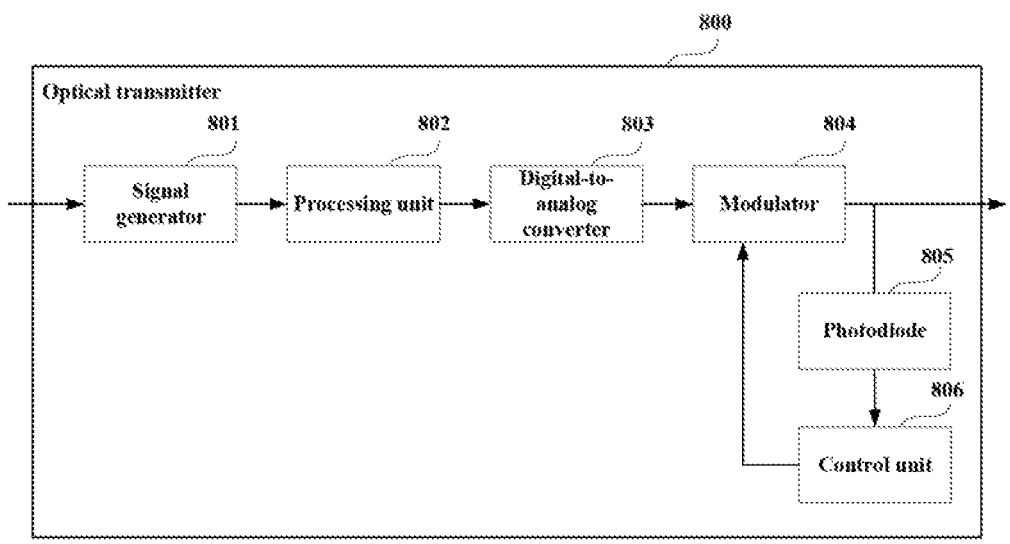
FIG. 8 is a block diagram of a systematic structure of the optical transmitter of the third aspect of the embodiments of this disclosure.

FIG. 8 is a block diagram of a systematic structure of the optical transmitter of the third aspect of the embodiments of this disclosure. As shown in FIG. 8, an optical transmitter 800 includes: a signal generator 801, a processing unit 802, a digital-to-analog converter 803, a modulator 804, a photodiode 805, and a control unit 806; wherein, the signal generator 801 generates two paths of digital signals according to transmission data, the two paths of digital signals being taken as driving signals of an I path and Q path of the modulator 804; the processing unit 802 performs mutual interference processing on the I and Q driving signals of the modulator 804; the digital-to-analog converter 803 performs digital-to-analog conversion on the I and Q driving signals after being mutual interference processed; the modulator 804 modulates light according to the driving signals; the photodiode 805 detects a power signal outputted by the modulator 804; and the control unit 806 controls a DC bias voltage of the modulator 804 according to the output power signal.

In this embodiment, structures of the signal generator 801, the digital-to-analog converter 803, the modulator 804, and the photodiode 805 may refer to existing techniques, and a structure and function of the control unit 806 are identical to those of the apparatus for monitoring a modulation depth of a dither signal in the first aspect of embodiments, which shall not be described herein any further.

Furthermore, the control unit 806 may be integrated into a digital signal processor of the optical transmitter, that is, the function of the control unit 806 is executed by the digital signal processor.

In this embodiment, the optical transmitter 800 does not necessarily include all the components shown in FIG. 8, and furthermore, the optical transmitter 800 may include components not shown in FIG. 8, and reference may be made to existing techniques.

An embodiment of this disclosure provides a computer readable program, which, when executed in an apparatus for monitoring a modulation depth of a dither signal or an optical transmitter, will cause the apparatus for monitoring a modulation depth of a dither signal or the optical transmitter to carry out the method for monitoring a modulation depth of a dither signal described in the second aspect of the embodiments of this disclosure.

An embodiment of this disclosure provides a computer storage medium, including a computer readable program, which will cause an apparatus for monitoring a modulation depth of a dither signal or an optical transmitter to carry out the method for monitoring a modulation depth of a dither signal described in the second aspect of the embodiments of this disclosure.

The apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in Figures. may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1. An apparatus for monitoring a modulation depth of a dither signal, including: a detector configured to detect an optical signal outputted by a Mach-Zehnder modulator to obtain an electrical signal, wherein a dither signal at a predetermined frequency is superimposed on a direct current bias voltage of the Mach-Zehnder modulator; a frequency-doubling dither signal synchronization detection module configured to perform synchronization detection on the electrical signal outputted by the detector and a frequency-doubling dither signal at a frequency twice the predetermined frequency, to obtain an amplitude of a signal component contained in the electrical signal outputted by the detector at a frequency identical to the frequency of the frequency-doubling dither signal; and a signal processor configured to calculate a modulation depth of the dither signal superimposed on the direct current bias voltage according to an amplitude of the frequency-doubling dither signal.

According to an aspect of an embodiment, the signal processor calculates the modulation depth according to a responsivity of the detector, power of a laser outputted by a laser providing an optical carrier for the Mach-Zehnder modulator, the signal component and an amplitude of a signal component at a frequency identical to the frequency of frequency-doubling dither signal.

According to an aspect of an embodiment, the signal processor calculates the modulation depth according to relation (9) below:

$$\sqrt{\frac{coef(2f_d) \cdot 16}{\pi^2 R P_0 \langle \cos(2\varphi_{sl}) \rangle}} \approx \frac{\alpha}{V_\pi^{local}}; \tag{9}$$

where, R is the responsivity of the detector, $P_0$ is the power of the laser, $\langle \cos(2\varphi_{SI}) \rangle$ is the signal component, and $\text{Coef}(2f_d)$ is the amplitude of the signal component at a frequency identical to the frequency of the frequency-doubling dither signal.

According to an aspect of an embodiment, the apparatus further comprises: an original frequency dither signal synchronization detection module configured to perform synchronization detection on the electrical signal outputted by the detector and an original frequency dither signal at a frequency that is the predetermined frequency, to obtain an amplitude of a signal component contained in the electrical signal outputted by the detector at a frequency identical to the frequency of the original frequency dither signal; and the signal processor calculates the modulation depth of the dither signal superimposed on the direct current bias voltage according to an amplitude of the frequency-doubling dither signal and an amplitude of the original frequency dither signal.

According to an aspect of an embodiment, the signal processor calculates the modulation depth according to the responsivity of the detector, the power of the laser outputted by the laser providing the optical carrier for the Mach-Zehnder modulator, the signal component, the amplitude of the signal component at the frequency identical to the frequency of the frequency-doubling dither signal and the amplitude of the signal component at the frequency identical to the frequency of the original frequency dither signal.

According to an aspect of an embodiment, the signal processor calculates the modulation depth by solving relation (7a) below:

$$(RP_0 \langle \cos(2\varphi_{sl}) \rangle)^2 \left(\frac{\pi \alpha}{V_\pi^{local}}\right)^4 - \tag{7a}$$
$$(coef(fd) \cdot 8)^2 \left(\frac{\pi \alpha}{V_\pi^{local}}\right)^2 - (coef(2fd) \cdot 16)^2 = 0;$$

where, R is the responsivity of the detector, $P_0$ is the power of the laser, $\langle \cos(2\varphi_{SI}) \rangle$ is the signal component, and $\omega_d$ is a circular frequency to which the frequency of dither signal corresponds.

According to an aspect of an embodiment, the signal processor further calculates a target adjustment amplitude of the dither signal according to the calculated modulation depth and a current amplitude and an initial modulation depth of the dither signal.

A method for monitoring a modulation depth of a dither signal, includes detecting an optical signal outputted by a Mach-Zehnder modulator to obtain an electrical signal, wherein a dither signal at a predetermined frequency is superimposed on a direct current bias voltage of the Mach-Zehnder modulator; performing synchronization detection on the electrical signal outputted by the detector and a frequency-doubling dither signal at a frequency twice the predetermined frequency, to obtain an amplitude of a signal component contained in the electrical signal outputted by the detector at a frequency identical to the frequency of the frequency-doubling dither signal; and calculating a modulation depth of the dither signal superimposed on the direct current bias voltage according to an amplitude ($\text{Coef}(2f_d)$) of the frequency-doubling dither signal.

According to an aspect of an embodiment, the calculating the modulation depth according to an amplitude of the frequency-doubling dither signal includes: calculating the modulation depth according to a responsivity of the detector, power of a laser outputted by a laser providing an optical carrier for the Mach-Zehnder modulator, the signal component and an amplitude of a signal component at a frequency identical to the frequency of frequency-doubling dither signal.

According to an aspect of an embodiment, the modulation depth is calculated according to relation (9) below:

$$\sqrt{\frac{coef(2f_d) \cdot 16}{\pi^2 R P_0 \langle \cos(2\varphi_{sl}) \rangle}} \approx \frac{\alpha}{V_\pi^{local}}; \tag{9}$$

where, R is the responsivity of the detector, $P_0$ is the power of the laser, $\langle \cos(2\varphi_{SI}) \rangle$ is the signal component, and $\text{Coef}(2f_d)$ is the amplitude of the signal component at a frequency identical to the frequency of the frequency-doubling dither signal.

According to an aspect of an embodiment, the method further includes: performing synchronization detection on the electrical signal and an original frequency dither signal at a frequency that is the predetermined frequency, to obtain an amplitude of a signal component contained in the electrical signal at a frequency identical to the frequency of the original frequency dither signal; wherein the modulation depth of the dither signal superimposed on the direct current bias voltage is calculated according to an amplitude of a signal component at the frequency identical to the frequency of the frequency-doubling dither signal and an amplitude of a signal component at the frequency identical to the frequency of the original frequency dither signal.

According to an aspect of an embodiment, the calculating the modulation depth of the dither signal superimposed on the direct current bias voltage according to the frequency of the frequency-doubling dither signal and the frequency of the original frequency dither signal includes: calculating the modulation depth according to the responsivity of the detector used for detecting the optical signal, the power of the laser outputted by the laser providing the optical carrier for the Mach-Zehnder modulator, the signal component, the amplitude of the signal component at the frequency identical to the frequency of the frequency-doubling dither signal and the amplitude of the signal component at the frequency identical to the frequency of the original frequency dither signal.

According to an aspect of an embodiment, the modulation depth is calculated by solving relation (7a) below:

$$(RP_0 \langle \cos(2\varphi_{sl}) \rangle)^2 \left(\frac{\pi\alpha}{V_\pi^{local}}\right)^4 - (coef(fd) \cdot 8)^2 \left(\frac{\pi\alpha}{V_\pi^{local}}\right)^2 - (coef(2fd) \cdot 16)^2 = 0; \qquad (7a)$$

where, R is the responsivity of the detector, $P_0$ is the power of the laser, $\langle \cos(2\varphi_{SI}) \rangle$ is the signal component, and $\omega_d$ is a circular frequency to which the frequency of dither signal corresponds.

According to an aspect of an embodiment, the method further includes: calculating a target adjustment amplitude of the dither signal according to the calculated modulation depth and a current amplitude and an initial modulation depth of the dither signal.

According to an aspect of an embodiment, the method further includes: making an in-phase modulation unit in the Mach-Zehnder modulator work at a quadrature point and a quadrature modulation unit work at an extinction point, and making signals outputted by the in-phase modulation unit and the quadrature modulation unit be in phase or in inverse phase; loading a first dither signal, an amplitude thereof being greater than a first amplitude threshold; making both the in-phase modulation unit and the quadrature modulation unit transmit all-zero signals; calculating a first amplitude of the signal component contained in the electrical signal obtained by detecting the optical signal outputted by the Mach-Zehnder modulator at a frequency identical to the frequency of the first dither signal and a second amplitude of a signal component at a frequency thrice the frequency of the first dither signal; and calculating the multiplicative component according to the first amplitude and second amplitude, the multiplicative component being used for calculating a modulation depth.

According to an aspect of an embodiment, the method further includes: making the in-phase modulation unit in the Mach-Zehnder modulator work at the quadrature point and the quadrature modulation unit work at the extinction point, and making signals outputted by the in-phase modulation unit and the quadrature modulation unit be in phase or in inverse phase; making the in-phase modulation unit transmit transmission signals and the quadrature modulation unit transmit all-zero signals; loading a second dither signal, an amplitude of the second dither signal being greater than a second amplitude threshold or less than a third amplitude threshold, the second amplitude threshold being greater than the third amplitude threshold; calculating a third amplitude of the signal component contained in the electrical signal obtained by detecting the optical signal outputted by the Mach-Zehnder modulator at a frequency identical to the frequency of the second dither signal; making both the in-phase modulation unit and the quadrature modulation unit transmit all-zero signals; calculating a fourth amplitude of the signal component contained in the electrical signal obtained by detecting the optical signal outputted by the Mach-Zehnder modulator at a frequency identical to the frequency of the second dither signal; and calculating the signal component according to the third amplitude and the fourth amplitude, the signal component being used for calculating a modulation depth.

According to an aspect of an embodiment, the method further includes: determining a first allowable range of modulation depth according to a code error cost requirement; determining a second allowable range of modulation depth according to a sensitivity requirement; determining a range of the modulation depth according to the first allowable range and the second allowable range; and determining the initial modulation depth from the range of modulation depth.

The invention claimed is:

1. An apparatus comprising:
   a detector to detect an optical signal output by a Mach-Zehnder modulator to obtain an electrical signal, wherein a dither signal at a determined frequency is superimposed on a direct current bias voltage of the Mach-Zehnder modulator;
   a frequency-doubling dither signal synchronization detection module to perform synchronization detection on the electrical signal output by the detector and a frequency-doubling dither signal at a frequency twice the determined frequency, to obtain an amplitude corresponding to a signal component contained in the electrical signal output by the detector at a frequency identical to the frequency of the frequency-doubling dither signal; and
   a signal processor to calculate a modulation depth of the dither signal superimposed on the direct current bias voltage according to the amplitude of the signal component at the frequency identical to the frequency of the frequency-doubling dither signal.

2. The apparatus according to claim 1, wherein,
   the signal processor calculates the modulation depth according to a responsivity of the detector, power of a laser output by a laser providing an optical carrier for the Mach-Zehnder modulator, the signal component and the amplitude of the signal component at the frequency identical to the frequency of the frequency-doubling dither signal.

3. The apparatus according to claim 2, wherein the signal processor calculates the modulation depth according to relation (9) below:

$$\sqrt{\frac{coef(2f_d) \cdot 16}{\pi^2 R P_0 \langle \cos(2\varphi_{sl}) \rangle}} \approx \frac{\alpha}{V_\pi^{local}}; \quad (9)$$

where, R is the responsivity of the detector, $P_0$ is the power of the laser, $\langle \cos(2\varphi_{SI}) \rangle$ is the signal component, and $Coef(2f_d)$ is the amplitude of the signal component at the frequency identical to the frequency of the frequency-doubling dither signal.

4. The apparatus according to claim 1, further comprising:
an original frequency dither signal synchronization detection module to perform synchronization detection on the electrical signal output by the detector and an original frequency dither signal at a frequency that is the determined frequency, to obtain an amplitude of a signal component contained in the electrical signal output by the detector at a frequency identical to the frequency of the original frequency dither signal; and
the signal processor calculates the modulation depth of the dither signal superimposed on the direct current bias voltage according to the amplitude of the signal component at the frequency identical to the frequency of the frequency-doubling dither signal and the amplitude of the signal component at the frequency identical to the frequency of the original frequency dither signal.

5. The apparatus according to claim 4, wherein,
the signal processor calculates the modulation depth according to the responsivity of the detector, the power of the laser outputted by the laser providing the optical carrier for the Mach-Zehnder modulator, the signal component, the amplitude of the signal component at the frequency identical to the frequency of the frequency-doubling dither signal and the amplitude of the signal component at the frequency identical to the frequency of the original frequency dither signal.

6. The apparatus according to claim 5, wherein the signal processor calculates the modulation depth by solving relation (7a) below:

$$(RP_0 \langle \cos(2\varphi_{sl}) \rangle)^2 \left( \frac{\pi \alpha}{V_\pi^{local}} \right)^4 - \\ (coef(fd) \cdot 8)^2 \left( \frac{\pi \alpha}{V_\pi^{local}} \right)^2 - (coef(2fd) \cdot 16)^2 = 0; \quad (7a)$$

where, R is the responsivity of the detector, $P_0$ is the power of the laser, $\langle \cos(2\varphi_{SI}) \rangle$ is the signal component, and $\omega_d$ is a circular frequency to which the frequency of dither signal corresponds.

7. The apparatus according to claim 1, wherein,
the signal processor further calculates a target adjustment amplitude of the dither signal according to the calculated modulation depth and a current amplitude and an initial modulation depth of the dither signal.

8. An optical transmitter comprising the apparatus for monitoring a modulation depth of a dither signal as claimed in claim 1.

9. A method comprising:
by at least one processor,
detecting an optical signal output by a Mach-Zehnder modulator to obtain an electrical signal, wherein a dither signal at a determined frequency is superimposed on a direct current bias voltage of the Mach-Zehnder modulator;
performing synchronization detection on the electrical signal and a frequency-doubling dither signal at a frequency twice the determined frequency, to obtain an amplitude corresponding to a signal component contained in the electrical signal at a frequency identical to the frequency of the frequency-doubling dither signal; and
calculating a modulation depth of the dither signal superimposed on the direct current bias voltage according to the amplitude of the signal component at the frequency identical to the frequency of the frequency-doubling dither signal.

10. The method according to claim 9, wherein the method further comprises:
performing synchronization detection on the electrical signal and an original frequency dither signal at a frequency that is the determined frequency, to obtain an amplitude of a signal component contained in the electrical signal at a frequency identical to the frequency of the original frequency dither signal;
wherein the modulation depth of the dither signal superimposed on the direct current bias voltage is calculated according to the amplitude of the signal component at the frequency identical to the frequency of the frequency-doubling dither signal and the amplitude of the signal component at the frequency identical to the frequency of the original frequency dither signal.

* * * * *